United States Patent

Baumann

[11] Patent Number: 5,731,910
[45] Date of Patent: Mar. 24, 1998

[54] OPTICAL SYSTEM WITH VARIABLE IMAGE SCALE

[75] Inventor: Hans-Georg Baumann, Jena, Germany

[73] Assignee: Carl Zeiss Jena GmbH, Jena, Germany

[21] Appl. No.: 448,533

[22] PCT Filed: Dec. 21, 1994

[86] PCT No.: PCT/EP94/04253

§ 371 Date: Jun. 14, 1995

§ 102(e) Date: Jun. 14, 1995

[87] PCT Pub. No.: WO95/18397

PCT Pub. Date: Jul. 6, 1995

[30] Foreign Application Priority Data

Dec. 24, 1993 [DE] Germany ............ 43 44 366.4

[51] Int. Cl.$^6$ .................................................. G02B 15/14
[52] U.S. Cl. ........................................ 359/689; 359/683
[58] Field of Search ......................... 359/689, 687, 359/380, 381, 686, 792, 683; 356/656–661

[56] References Cited

U.S. PATENT DOCUMENTS

| 4,130,350 | 12/1978 | Koizumi | 359/659 |
| 4,525,042 | 6/1985 | Muchel | 359/380 |
| 4,563,060 | 1/1986 | Yamagishi | 359/658 |
| 5,076,676 | 12/1991 | Saito | 359/656 |
| 5,321,446 | 6/1994 | Mossig | 359/235 |
| 5,359,417 | 10/1994 | Muller et al. | 359/389 |
| 5,371,626 | 12/1994 | Betensky | 359/687 |

FOREIGN PATENT DOCUMENTS

| 0 033 375 | 8/1981 | European Pat. Off. . |
| 0 453 239 | 10/1991 | European Pat. Off. . |

OTHER PUBLICATIONS

Patent Abstracts of Japan, unexamined applications, P field, vol. 16, No. 345, issued 27 Jul. 1992 and JP, A, 4–104116 (Touyou Kougaku Kougiyou K.K.).

Primary Examiner—David C. Nelms
Assistant Examiner—Jordan M. Schwartz
Attorney, Agent, or Firm—McAulay Fisher Nissen Goldberg & Kiel, LLP

[57] ABSTRACT

An optical system with variable image scale for video recordings by means of a CCD camera at a microscope. A video zoom adapting arrangement with a short overall length which enables all image scales for video cameras required in practice is realized in that three optical components with a positive focal length are provided. One optical component is stationary and a second and third optical component are arranged after the first optical component, as viewed in the imaging direction, so as to be displaceable.

20 Claims, 2 Drawing Sheets

MICROSCOPE

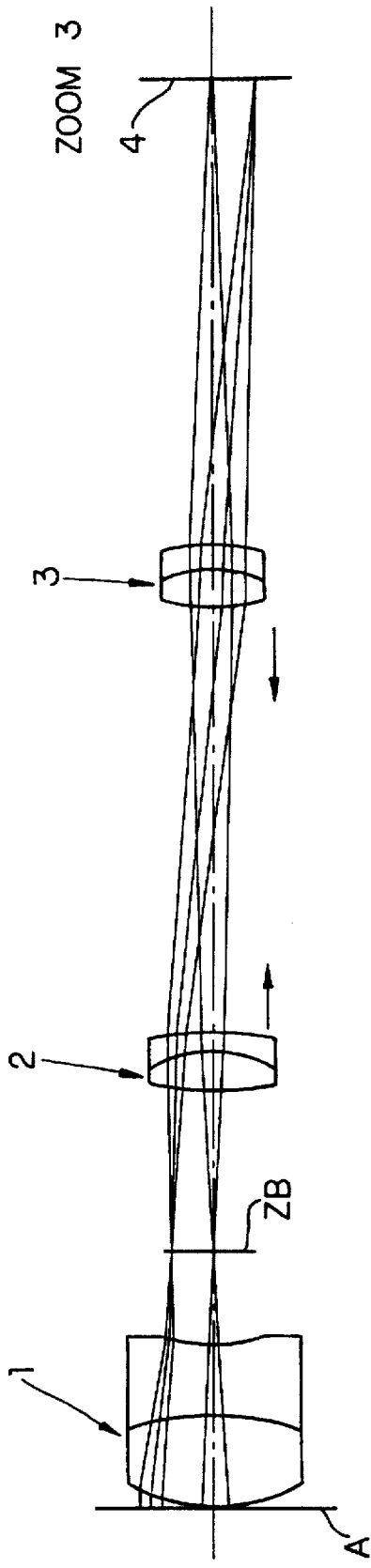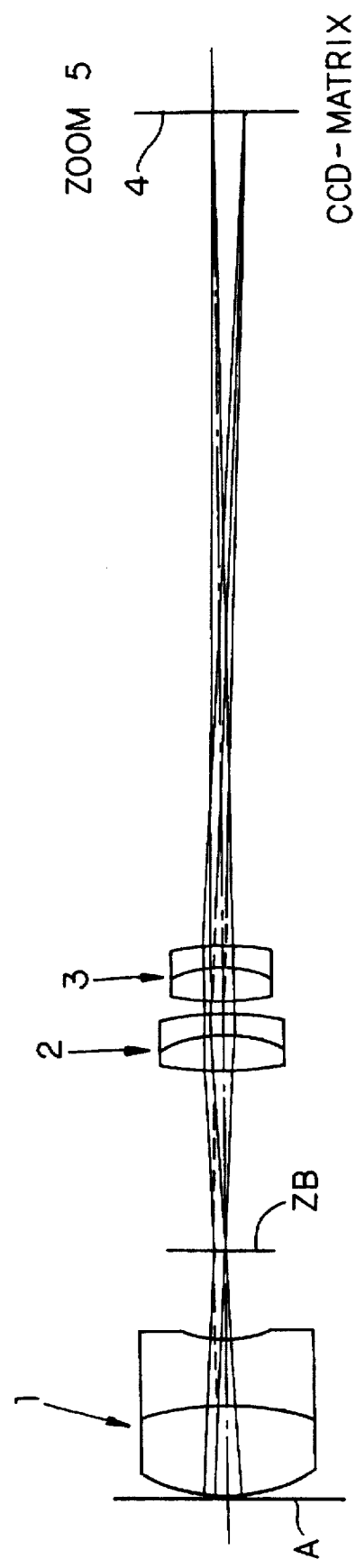

OPTICAL SYSTEM WITH VARIABLE IMAGE SCALE

BACKGROUND OF THE INVENTION a) Field of the Invention

The invention is directed to an optical system with variable image scale for imaging an image which is generated by microscope in the plane of the CCD matrix of a video camera.

b) Description of the Related Art

Video outputs on microscopes are required for various operations such as viewing on a monitor, producing video prints, computer-aided image processing or file storage.

If the intermediate image is produced on the CCD matrix without an adapting optical system, an optimal image scale or image section will seldom result. Special video adapting equipment in the form of Homal lenses or projection lenses may help to remedy this defect, but zoom systems are more advantageous.

The required zoom range is given by the quotient of the diameter of the CCD matrix to the microscope intermediate image with approximately 8.8 mm/2 mm=0.4 as the smallest value to the quotient of the resolution of the CCD matrix and intermediate image with 10 m/5 m=2 as the largest value.

In so doing, it is taken into account that the resolution achieved in automatic image evaluation will be roughly twice the resolution achieved visually. For this purpose, an image correction corresponding to the high-resolution color camera must be made with the given technical mating or connection dimensions.

Zoom systems with finite transmission length, e.g., for facsimile printing or copiers, which can theoretically be used in combination for such purposes are known (DE 3544148, DE 3418639). However, the disadvantages of such systems with respect to overall length, number of optical components and required range of the image scale are hardly acceptable.

U.S. Pat. No. 3,454,321 describes a pancratic system formed of two moving lenses with positive lens power. Its overall length is relatively great. Further, the intermediate image that is formed lies between the lenses, i.e., an additional lens system would be necessary in order to generate a real image on the CCD matrix. The indicated magnification scales are not suitable for solving the problem addressed here.

OBJECT AND SUMMARY OF THE INVENTION

The primary object of the present invention is to realize a video zoom adaptation arrangement which enables all image scales required in practice for currently available and anticipated types of video camera and which, in spite of this requirement, makes do with few optical components and accordingly offers an economical and efficient solution for the user.

This object is met according to the invention in an optical system with variable image scale for imaging an image which is generated by a microscope in the plane of the CCD matrix of a video camera comprising three lens groups with positive focal length. The three optical components including a first lens group which is stationary and a second and third lens group which are arranged after the first lens group, as viewed in the imaging direction, so as to be displaceable along the optical axis for varying the image scale. The first lens group is constructed as a meniscus which is arranged in front of the image generated by the microscope and whose final surface is dispersive for correcting the field curvature and is situated in front of an intermediate image which is produced by the first lens group. Particularly advantageous further developments of the invention are indicated in the dependent claims and are explained more fully in the following description.

The optical system according to the invention is formed of three components with positive lens power, the first component, as viewed in the direction of light, being a stationary achromatic lens group, while the second and third components are achromatic groups which are displaceable along the optical axis.

The first lens group is advantageously constructed as a lens which is arranged before the image B generated by the microscope and whose final surface is dispersive for correcting the field curvature and lies near the intermediate image ZB, while, on the other hand, its first surface lies near the device contact surface A for producing the correct position of the exit pupil. As is shown in the drawings, a meniscus shaped first lens group with more than one lens can be used in the invention. This may be achieved, for example, by cementing two lens together. In a particularly advantageous manner, the exit pupil is located in the third lens group when the latter is in the center displacement position. This results in a slightly convergent pupil imaging so that the small angular coverage required for high-resolution color cameras is maintained on the whole within the entire zoom range.

Moreover, as a result of this pupil imaging, a minimum diameter of the second and third lens groups is achieved, which is not only optimal for correcting the field of view, but also has cost benefits.

Another inventive characteristic of the first optical component consists in that the intermediate image is imaged in an image scale of approximately 1:2 which leads to a reduction in overall length and, in combination with the meniscus-shaped construction, also compensates for the field curvature of the collective second and third components, for which reason the dispersive final surface of the field lens group is advisably situated at the shortest possible distance before the occurring intermediate image without being sharply imaged itself.

In the simplest case, the second and third optical components are two identically constructed achromatic cemented lenses with a focal length of roughly ⅓ of the overall length B1 (distance from the microscope intermediate image to the CCD matrix) and with a distance from one another of roughly ⅓ of the overall length in the center zoom position. In a different scenario, the second and third optical components can have different focal lengths f2 and f3 where the relationship to the overall length is defined as f2/B1=0.4±0.1 and f3/B1=0.3±0.1.

The intermediate image projected by the first component lies in the anterior focal point of the second component and the CCD matrix lies in the posterior focal point of the third component. The second and third components accordingly produce an image scale of 1:1, i.e., roughly 0.5:1 in conjunction with the first component. If the second and third components are shifted forward, a higher image scale results and vice versa.

In order to maintain focus on the CCD matrix during this joint displacement of the second and third lens groups, the third lens group must be moved differently than the second lens group so that the overall length is maintained constant. In particular, the displacement of the third component along the optical axis can be coupled linearly to the movement of an adjusting element for varying the magnification, and the displacement of the second component can be coupled nonlinearly to the movement of the adjusting element. However, it is also possible to displace the second and third lens groups jointly as a constructional unit and to achieve a focal balance by displacing the camera system. The advantage herein consists in that the reciprocal centering has no effect on the image errors, but rather only results in a center offset.

For zoom ranges greater than 4×, it is advisable to dispense with the mirror-symmetric construction of the second and third components described above for the sake of improved image correction for smaller image scales.

In order to achieve an image quality within the entire zoom range which satisfies the requirements of the best color camera, all three components must be individually corrected achromatically, also with respect to color magnification. In the simplest solution for the construction according to the invention, each of the three components is a single cemented lens and the second and third components are formed of the same dense crown glass and dense flint glass.

BRIEF DESCRIPTION OF THE DRAWINGS

FIG. 1C shows an image of a microscope which uses a zoom feature in accordance with the present invention, where the microscope provides a zoom factor of 3; and FIG. 1D shows an image of a microscope which uses a zoom feature in accordance with the present invention, where the microscope provides a zoom factor of 5.

DESCRIPTION OF THE PREFERRED EMBODIMENTS

Figure 1A:
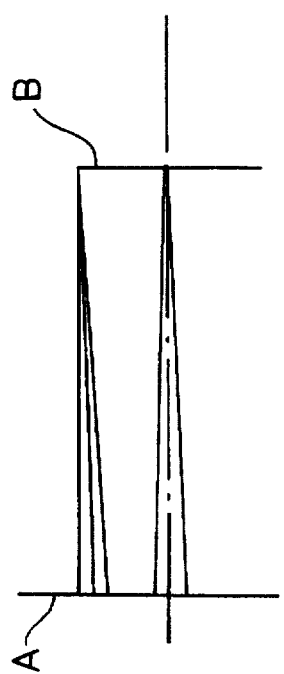
FIG. 1A shows an image of a microscope without a zoom feature.
Figure 1B:
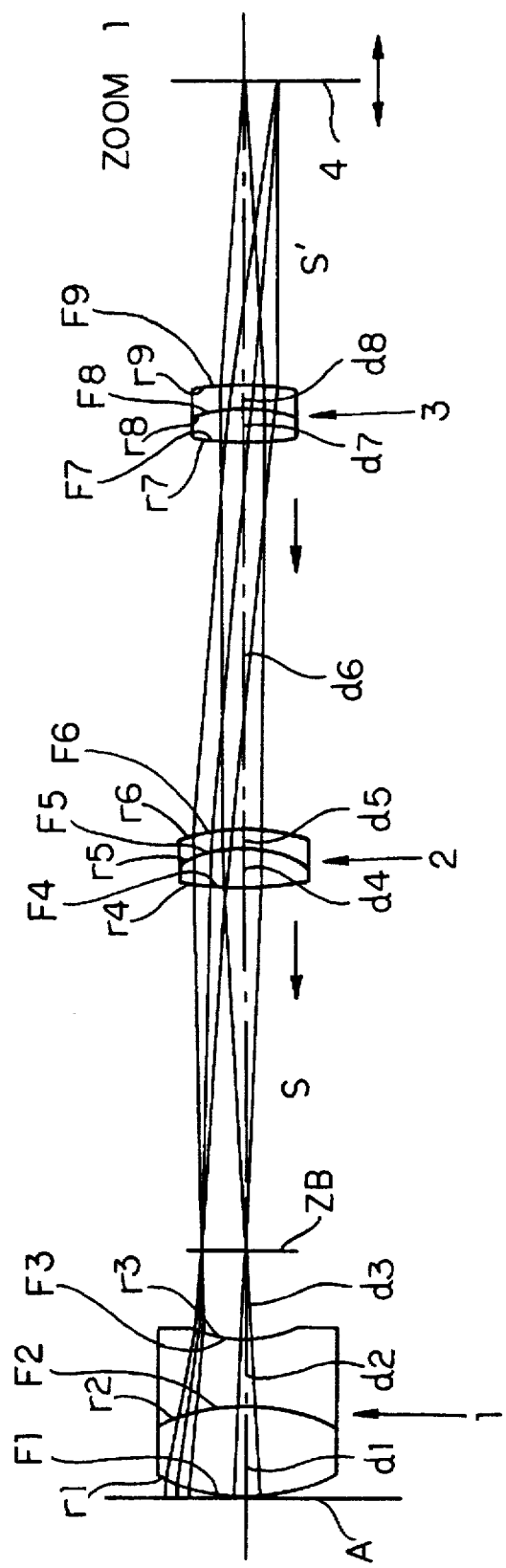
FIG. 1B shows an image of a microscope which uses a zoom feature in accordance with the present invention, where the microscope provides a zoom factor of 1.

The invention is explained more fully by means of the schematic view in FIG. 1 in different zoom positions. The contact surface of the video output or photo output of the microscope is designated by A and the image generated by the microscope without a zoom is designated by B. By means of a first optical component 1 with two lenses of thickness d1 and d2 and lens surfaces F1, F2, F3, this image B is imaged in an intermediate image plane ZB at a distance d3 from F3.

Further along the optical path, a second and third optical component 2, 3 with lenses of thickness d4, d5 and lens surfaces F4, F5, F6 and F7, F8, F9 and d7, d8, respectively, are arranged so as to be displaceable in each instance before the CCD matrix 4. The distance between the intermediate image plane ZB and F4 is designated by S, the distance between F6 and F7 is d6, and the distance between surface f9 and the CCD matrix 4 is S'. The radii of curvature of the individual lenses are r1–r9.

Positions of the optical components 1, 2 and 3 corresponding to zoom factors 1, 3 and 5 are shown in the drawing. The optical parameters of the second and third components have the following values within a tolerance of ±20%:

| optical component | surface F | radius r | thickness d | refractive index | Abbe number |
|---|---|---|---|---|---|
| 2 | F4 | r4 = 207.09 | d4 = 5.10 | 1.60994 | 56.38 |
|   | F5 | r5 = −16.555 | d5 = 2.90 | 1.67764 | 31.97 |
|   | F6 | r6 = −41.726 |   |   |   |
| 3 | F7 | r7 = 41.129 | d7 = 4.97 | 1.60994 | 56.38 |
|   | F8 | r8 = −16.555 | d8 = 3.03 | 1.67764 | 31.97 |
|   | F9 | r9 = −53.884 |   |   |   |

The optical parameters of the first component are:

| surface F | radius r | thickness d | refractive index | Abbe number |
|---|---|---|---|---|
| F1 | r1 = 22.786 | d1 = 13.4 | 1.61170 | 46.14 |
| F2 | r2 = −28.978 | d2 = 10.96 | 1.70445 | 29.84 |
| F3 | r3 = 24.412 |   |   |   | at a distance AB of 60 mm and an intermediate image distance d3 of 12.54.

The movement of the second and third components can be illustrated by the following table:

| zoom factor | distance S (intermediate image to F4) | air separation d6 | image distance S' |
|---|---|---|---|
| 1 | 54.326 | 54.717 | 44.957 |
| 1.5 | 24.792 | 60.949 | 68.219 |
| 2 | 18.698 | 52.126 | 83.136 |
| 2.5 | 19.428 | 41.766 | 92.766 |
| 3 | 21.257 | 21.256 | 100.447 |
| 3.5 | 23.149 | 23.676 | 107.135 |
| 4 | 24.894 | 15.875 | 113.191 |
| 4.5 | 26.459 | 8.708 | 118.793 |
| 5 | 27.856 | 2.060 | 124.044 |

Other advantageous variants of the invention besides the embodiment example shown herein are also possible. For instance, as was already mentioned, the second and third components can be identical and can be displaced in the same direction by the same distance, wherein the CCD matrix is guided along the optical axis. Other embodiment forms of the first component are also possible in that the ratio of the focal length f1 of the first component to the overall length BI is 1±0.2 and the image scale is 0.4–2 and the distance AB of the contact surface A of the video output or photo output of the microscope from the image B generated by the microscope is greater than or equal to 60 mm with the following optical parameters of the first component within a tolerance of ±20%:

| surface F | radius r | thickness d | refractive index | Abbe number |
|---|---|---|---|---|
| F1 | r1 = 22.786 | d1 = 13.04 | 1.61170 | 46.14 |
| F2 | r2 = −28.978 | d2 = 10.96 | 1.70445 | 29.84 |
| F3 | r3 = 24.412 |   |   |   | at a distance AB greater than or equal to 60 mm and a distance d3 from the intermediate image of 12.54.

The distance of the first surface F1 from the device contact surface A is increased by means of a spacer ring by the amount greater than the amount of AB above 60 mm.

Another construction of the first component consists in that the ratio of the focal length f1 to the overall length B1 is 0.68 ±20% at an image scale of 0.5–2.5 and a distance AB greater than or equal to 44 mm with the following parameters of the first component within a tolerance of 20%:

| surface F | radius r | thickness d | refractive index | Abbe number |
|---|---|---|---|---|
| F1 | r1 = 35.738 | d1 = 13.00 | 1.60994 | 56.38 |
| F2 | r2 = −29.427 | d2 = 12.00 | 1.66885 | 35.56 |
| F3 | r3 = 74.989 | | | | at a distance AB greater than or equal to 44 mm and an intermediate image distance d3 of 11.54.

In another embodiment of the invention, the first optical lens group is formed of three lenses and the following optical parameters of the first component within a tolerance of ±20% are:

| surface F | radius r | thickness d | refractive index | Abbe number |
|---|---|---|---|---|
| F1 | 29.442 | 8.06 | 1.66742 | 39.81 |
| F2 | −20.901 | 21.45 | 1.85503 | 23.64 |
| F3 | −17.853 | 5.99 | 1.58482 | 37.50 |
| F4 | 24.623 | | | | at a distance of 49 mm and an intermediate image distance d3=6 mm; wherein surface F1 lies 5 mm in front of the contact surface.

In yet another embodiment of the invention, the second and third lens groups are formed of at least one collective lens and dispersive lens, respectively, in order to keep longitudinal color aberrations and transverse color aberrations along the zoom region below the resolution limit of the CCD matrix.

In still another embodiment of the invention, a spacer ring is used to increase distance AB between the device contact surface and the first surface F1.

What is claimed is:

1. An optical system with a variable image scale for imaging an image, which is generated by a microscope, on a CCD matrix of a video camera, said optical system comprising:
   three lens groups, each group having a positive focal length;
   said three lens groups including a first lens group which is stationary and a second and third lens group which are arranged after the first lens group, as viewed in an imaging direction, where said second and third lens groups are displaceable along the optical axis for varying the image scale;
   said first lens group being meniscus shaped and arranged to receive an image generated by the microscope when the first, second and third lens groups are not used, said first lens group also including a first surface and a second surface, where said second surface is the most image side surface of the first lens group and is dispersive for correcting field curvature and is situated in front of an intermediate image which is produced by the first lens group.

2. The optical system according to claim 1, wherein the second surface of the meniscus shaped first lens group is adjacent to the intermediate image and the first surface of the meniscus shaped first lens group is adjacent to a device contact surface of the microscope.

3. The optical system according to claim 1, wherein said first, second and third lens groups are constructed as achromatic cemented lenses.

4. The optical system according to claim 1, wherein said second and third lens groups are identical in all optical parameters.

5. The optical system according to claim 4, wherein the second and third lens groups have a focal length of roughly ⅓ of an overall length as measured from the intermediate image produced by the first lens group to the CCD matrix.

6. The optical system according to claim 5, wherein a distance between the second and third lens groups is approximately ⅓ of said overall length in the center zoom position.

7. The optical system according to claim 1, wherein the second and third lens groups have different focal lengths f2 and f3, where each focal length has the following relationship to an overall length B1 as measured from the intermediate image produced by the first lens group to the CCD matrix:

$$f2/B1 = 0.4 +/- 0.1 \quad f3/B1 = 0.3 +/- 0.1$$

8. The optical system according to claim 1, wherein the second and third lens groups are displaced jointly by the same distance in the same direction along the optical axis to change the image scale and the CCD matrix is arranged so as to be displaceable along the optical axis for focussing.

9. The optical system according to claim 1, wherein the second and third optical lens groups are displaced along the optical axis by different amounts to change the image scale while maintaining a constant overall length, as measured from the intermediate image produced by the first lens group to the CCD matrix.

10. The optical system according to claim 1, wherein the displacement of the third lens group along the optical axis is coupled linearly to the movement of an adjusting element for varying the magnification, and the displacement of the second lens group is coupled nonlinearly to the movement of the adjusting element.

11. The optical system according to claim 1, wherein the second and third lens groups are formed of at least one collective lens and dispersive lens, respectively, to keep longitudinal color aberrations and transverse color aberrations below a resolution limit of the CCD matrix.

12. The optical system according to claim 1, wherein the optical parameters of the second and third lens groups have the following values within a tolerance of ±20%:

| optical component | surface F | radius r | thickness d | refractive index | Abbe number |
|---|---|---|---|---|---|
| 2 | F4 | r4 = 207.09 | d4 = 5.10 | 1.60994 | 56.38 |
|   | F5 | r5 = 16.555 | d5 = 2.90 | 1.67764 | 31.97 |
|   | F6 | r6 = −41.726 | d6 = variable | | |
| 3 | F7 | r7 = 41.129 | d7 = 4.97 | 1.60994 | 56.38 |
|   | F8 | r8 = 16.555 | d8 = 3.03 | 1.67764 | 31.97 |
|   | F9 | r9 = −53.884 | | | | and the following movement is carried out for changing the zoom factor:

| zoom factor | distance S (intermediate image to F4) | air separation d6 | image distance S' |
|---|---|---|---|
| 1 | 54.326 | 54.717 | 44.957 |
| 1.5 | 24.792 | 60.949 | 68.219 |
| 2 | 18.698 | 52.126 | 83.136 |
| 2.5 | 19.428 | 41.766 | 92.766 |
| 3 | 21.257 | 21.256 | 100.447 |
| 3.5 | 23.149 | 23.676 | 107.135 |
| 4 | 24.894 | 15.875 | 113.191 |
| 4.5 | 26.459 | 8.708 | 118.793 |
| 5 | 27.856 | 2.060 | 124.044 |

13. The optical system according to claim 1, wherein the ratio of the focal length of the first lens group to the overall length, as measured from the intermediate image produced by the first lens group to the CCD matrix, is 1±0.2 and the image scale is 0.4–2 and a distance between output of the microscope and the image generated by the microscope when said first, second and third lens groups are not used is greater than or equal to 60 mm.

14. The optical system according to claim 13, wherein the following optical parameters of the first lens group are present within a tolerance of ±20%:

| surface F | radius r | thickness d | refractive index | Abbe number |
|---|---|---|---|---|
| F1 | r1 = 22.786 | d1 = 13.4 | 1.61170 | 46.14 |
| F2 | r2 = 28.978 | d2 = 10.96 | 1.70445 | 29.84 |
| F3 | r3 = 24.412 | | | | wherein said distance is greater than or equal to 60 mm and an intermediate image distance, as measured from said second surface of said first lens group to said intermediate image plane, is 12.54.

15. The optical system according to claim 1, wherein the ratio of the focal length of the first lens group to the overall length, as measured from the intermediate image produced by the first lens group to the CCD matrix, is 0.68±20% at an image scale of 0.5–2.5 and a distance between output of the microscope and the image generated by the microscope when said first, second and third lens groups are not used is greater than or equal to 44 mm.

16. The optical system according to claim 15, wherein the following parameters of the first lens group are within a tolerance of 20%:

| surface F | radius r | thickness d | refractive index | Abbe number |
|---|---|---|---|---|
| F1 | r1 = 35.738 | d1 = 13.00 | 1.60994 | 56.38 |
| F2 | r2 = 29.427 | d2 = 12.00 | 1.66885 | 35.56 |
| F3 | r3 = 74.989 | | | | wherein said distance is greater than or equal to 44 mm and an intermediate image distance, as measured from said second surface of said first lens group to said intermediate image plane, is 11.54.

17. The optical system according to claim 1, wherein the ratio of the focal length of said first lens group to the overall length, as measured from the intermediate image produced by the first lens group to the CCD matrix, is 0.55±20% at a zoom range of 0.4–2.0 and a distance between output of the microscope and the image generated by the microscope when said first, second and third lens groups are not used is greater than or equal to 44 mm.

18. The optical system according to claim 17, wherein the first lens group is formed of three lenses and the following are the optical parameters of the first lens group within a tolerance of ±20%:

| surface F | radius r | thickness d | refractive index | Abbe number |
|---|---|---|---|---|
| F1 | 29.442 | 8.06 | 1.66742 | 39.81 |
| F2 | −20.901 | 21.45 | 1.85503 | 23.64 |
| F3 | −17.853 | 5.99 | 1.58482 | 37.50 |
| F4 | 24.623 | | | | wherein said distance is 49 mm and an intermediate image distance, as measured from said second surface of said first lens group to said intermediate image plane, is 6 mm and said surface F1 lies 5 mm from a contact surface of said microscope.

19. The optical system according to claim 11, wherein a spacer ring is used to increase distance between a contact surface of said microscope and the first surface of said first lens group.

20. The optical system according to claim 5, wherein the intermediate image projected by the first lens group lies at an anterior focal point of the second lens group and the CCD matrix lies at an posterior focal point of the third lens group.

* * * * *